United States Patent
Olchovik

(10) Patent No.: US 12,534,024 B2
(45) Date of Patent: Jan. 27, 2026

(54) ROOF RACK

(71) Applicant: ALLTRADE TOOLS LLC, Cypress, CA (US)

(72) Inventor: Samuel Sergei Olchovik, Nampa, ID (US)

(73) Assignee: ALLTTRADE TOOLS LLC, Cypress, CA (US)

( * ) Notice: Subject to any disclaimer, the term of this patent is extended or adjusted under 35 U.S.C. 154(b) by 140 days.

(21) Appl. No.: 18/619,006

(22) Filed: Mar. 27, 2024

(65) Prior Publication Data

US 2025/0303974 A1 Oct. 2, 2025

(51) Int. Cl.
*B60R 9/045* (2006.01)

(52) U.S. Cl.
CPC .................... *B60R 9/045* (2013.01)

(58) Field of Classification Search
CPC ................. B60R 9/04; B60R 9/045
USPC ....................................... 224/309
See application file for complete search history.

(56) References Cited

U.S. PATENT DOCUMENTS

| | | | | |
|---|---|---|---|---|
| 2,387,779 | A * | 10/1945 | Strauss | B60R 9/045 224/325 |
| 3,002,664 | A * | 10/1961 | Guevara | B60R 9/045 224/314 |
| 4,489,868 | A * | 12/1984 | Thirion | B60R 9/045 224/326 |
| 8,016,172 | B1 * | 9/2011 | Mefford | B60R 9/045 224/325 |
| 9,796,428 | B1 * | 10/2017 | Tamaddon-Dallal | B60R 9/045 |
| 2018/0215322 | A1 * | 8/2018 | D'Angelo | B60R 9/045 |
| 2023/0001857 | A1 * | 1/2023 | Gustaveson | B60R 9/045 |
| 2024/0101039 | A1 * | 3/2024 | Warech | B60R 9/045 |
| 2024/0140322 | A1 * | 5/2024 | DeHerrera | B60R 9/045 |

* cited by examiner

Primary Examiner — Peter N Helvey

(57) ABSTRACT

An adjustable roof rack configured to be anchored to an automobile, a main portion comprising a distal cross beam extending from the left side toward the right side and which defines a plurality of openings extending through the distal cross beam, each opening configured to receive a bar extending in a direction from the proximal end toward the distal end; a plurality of main floor bars, each main floor bar extending through one of the openings respectively in the distal cross beam, and being attached to the distal cross beam so as to be positionally adjustable in relation to the distal cross beam; a distal portion movably attached to the main portion, wherein the distal portion is movable in relation to the main portion such that when the distal portion is moved, all of the distal floor bars move simultaneously within the openings in the distal cross beam.

7 Claims, 2 Drawing Sheets

ROOF RACK

FIELD OF THE INVENTION

The present invention relates to the field of roof racks for carrying goods on the roof of an automobile.

BACKGROUND

The modern automotive landscape is characterized by a diverse range of vehicles designed to cater to various consumer needs and lifestyles. One essential aspect of vehicle design is the ability to transport cargo efficiently and securely. Roof racks have long been employed as an external storage solution for automobiles, enabling users to carry a variety of items such as luggage, sporting equipment, and outdoor gear. However, existing roof rack systems often present challenges related to installation, aerodynamics, and adaptability.

Traditional roof rack designs commonly involve complex installation procedures, requiring users to invest time and effort in securing the system to the vehicle. Additionally, these systems may compromise vehicle aerodynamics, resulting in increased wind resistance and reduced fuel efficiency. Moreover, many existing roof racks lack the adaptability to accommodate various types and sizes of cargo securely. And even when such cargo is securely contained, roof rack designs may be too flimsy and flexible to maintain their shape.

This background underscores the need for a novel and improved roof rack system that addresses the shortcomings of current solutions. The envisioned roof rack aims to provide a user-friendly installation process, enhance vehicle aerodynamics, and offer adaptability for diverse cargo sizes and types. By addressing these challenges, the proposed roof rack system seeks to revolutionize the way users transport goods on their vehicles, providing a more efficient, streamlined, robust, and versatile solution.

The innovation proposed in this application focuses on addressing these and other needs.

SUMMARY OF THE INVENTION

In a preferred embodiment, the invention is an adjustable roof rack having a proximal end and a distal end and a left side and a right side. The adjustable roof rack comprises a main portion, configured to be anchored to a roof of an automobile, where the main portion comprises a distal cross beam attached to the main portion. The distal cross beam extends from the left side toward the right side and which defines a plurality of openings extending through the distal cross beam, each opening configured to receive a bar extending in a direction from the proximal end toward the distal end. The main portion further comprises a plurality of main floor bars, each main floor bar extending through one of the openings respectively in the distal cross beam, and being attached to the distal cross beam so as to be positionally adjustable in relation to the distal cross beam. The adjustable rack further comprises a distal portion movably attached to the main portion, where the distal portion comprises a plurality of distal floor bars, each distal floor bar having a distal end and a proximal end, and being fixed at the distal end thereof to the distal portion, each distal floor bar being arranged to slidably extend through one of the openings respectively in the distal cross beam. Under this configuration, the distal portion is movable proximally and, alternatively, distally in relation to the main portion such that when the distal portion is moved proximally, or distally, all of the distal floor bars move simultaneously within the openings in the distal cross beam.

In some embodiments of the adjustable roof rack, the distal cross beam comprises a top half beam, and a bottom half beam, which are configured such that, when the top half beam is placed in contact with the bottom half beam, the distal cross beams are formed and the openings are formed in the distal cross beam. In further embodiments, the distal cross beam is attached at a left extremity to a left side lateral bar of the main portion and at a right extremity to a right side lateral bar of the main portion, wherein the top half beam and the bottom half beam may be temporarily separated from each other whereupon the distal cross beam may be adjusted in its longitudinal relation to the left side lateral bar and the right side lateral bar. In further embodiments, the adjustable roof rack further comprises a screw means for clamping the top half beam onto the bottom half beam sufficient to also clamp the distal cross beam onto the left side lateral bar and the right side lateral bar.

In yet further embodiments of the adjustable roof rack, the openings in the distal cross beam are arranged so that each alternate opening is fitted with a grommet to facilitate distal alternately proximal movement of a distal floor bar.

In further embodiments of the adjustable rack a buffer bar is provided to extend in a direction from the left side toward the right side, and is attached to each of the distal floor bars adjacent a proximal end of each distal floor bar so that, in a condition when the distal portion is moved distally, the buffer bar comes into contact with the distal cross beam to provide a maximum extent to which the distal portion may be moved distally.

In a further embodiment of the adjustable roof rack, the main portion further comprises a proximal cross beam attached to the main portion, the proximal cross beam extending from the left side toward the right side and which defines a plurality of openings extending through the proximal cross beam, each opening configured to receive a bar extending in a direction from the proximal end toward the distal end. Further, each main floor bar extends through one of the openings respectively in the proximal cross beam, and is attached to the proximal cross beam so as to be positionally adjustable in relation to the proximal cross beam. Further, the adjustable roof rack may comprise a proximal portion movably attached to the main portion, wherein the proximal portion includes a plurality of proximal floor bars each having a distal end and a proximal end, each proximal floor bar being immovably fixed at the proximal end thereof to the proximal portion, each proximal floor bar being arranged to slidably extend through one of the openings respectively in the proximal cross beam. Under this configuration, the proximal portion is movable proximally and, alternatively, distally in relation to the main portion such that when the proximal portion is moved proximally, or distally, all of the proximal floor bars move simultaneously within openings in the proximal cross beam.

These and other advantages of the invention will appear from the detailed description of the drawings and the embodiments.

DETAILED DESCRIPTION OF THE DRAWINGS

DETAILED DESCRIPTION OF THE PREFERRED EMBODIMENTS

In the following detailed description, certain preferred embodiments are described in order to provide a thorough understanding of the present invention.

Figure 1:
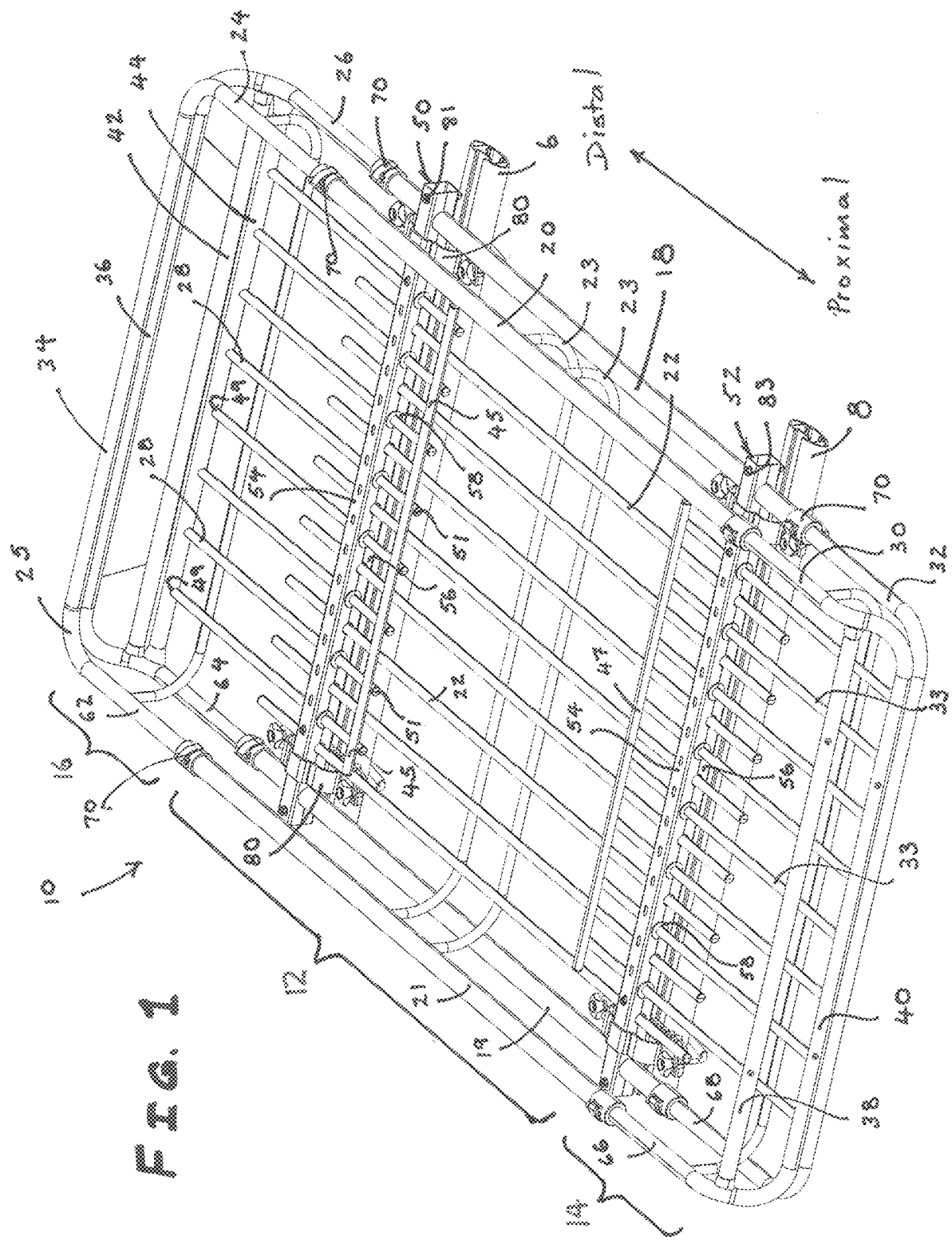
FIG. 1 is a perspective view from above of a roof rack showing features of the invention.

The invention comprises, in one embodiment, an adjustable roof rack 10, exemplified as in FIG. 1. As used herein to explain the embodiment in the figures, proximal is the direction toward the bottom of FIG. 1 (the front end of a motor vehicle beneath the roof rack), and distal is the direction toward the top of FIG. 1. However, the terms distal and proximal can be reversed without altering the scope of the invention.

Referring to FIG. 1, cross supports 6, 8 are shown that are affixed to an automobile (automobile not shown in the Figures) in a known fashion. These cross supports may be sold along with the roof rack 10 or may be supplied as components fixed to the motor vehicle. Either way, they are used in order to attach the roof rack to the automobile.

In preferred embodiments, the roof rack 10 may be conceptually divided into three portions that are movable linearly, proximally and distally, in relation to each other. A main portion 12 is shown in FIG. 1 by delineating lines, and comprises elements, that will be described, which are attached to the automobile in such a way that, when so attached and in use, the main portion 12 is may not be movable in relation to the automobile. A proximal portion 14 is configured to be attached proximally to the main portion so as to be adjustable both proximally and distally in relation the main portion 12. A distal portion 16 is configured to be attached distally to the main portion so as to be adjustable both proximally and distally in relation to the main portion 12 as described below.

Turning first to the main portion 12, the main portion is bounded on left and right lateral sides by lateral bars which provide containment along the left and right sides of the rack. On the right side are lateral bar 18 and lateral bar 20. On the left side are lateral bar 19 and lateral bar 21. It will be appreciated that either more than, or less than, two lateral bars may be provided for lateral containment.

On the floor of the main portion 12 of the rack are located a plurality of parallel longitudinal main floor bars 22 which extend parallel with each other. Together, the lateral bars and the main floor bars provide lateral containment and floor containment for goods that are loaded in the main portion 12 of the roof rack 10. Additional distribution beams 23 may be placed perpendicular to the main floor bars 22 to distribute the load more evenly.

Towards the distal end of the main portion there is provided a distal cross beam 50, and towards the proximal end of the main portion there is provided a proximal cross beam 52. Each cross beam 50, 52 spans between (and is connected to) the right lateral bar 18 and the left lateral bar 19. Each cross beam may consist of a top half beam 54, and a bottom half beam 56. Each cross beam 50, 52 is configured to define a plurality of openings 58, some of which may be protected by a polymer grommet 60 configured to allow a tube (to be described) to slide within the grommet. (Best seen in FIG. 3)

In the embodiment shown in FIG. 1, each cross beam 50, 52 may have seventeen openings 58: eight of which may include a grommet 60, and nine of which may not include a grommet. A different number of openings may be used as needed. The openings with grommets may be designed to receive a sliding tube, while those openings without a grommet may be designed to receive a tube that is fixed into the opening, either by welding or friction grip. Either type of opening may fix a tube by frictional force, imparted by screwing the top half beam 54 onto the bottom half beam 56. In the disclosed embodiment, the main floor bars 22 extend through an opening 58 in the distal cross beam 50 and span to pass through an opening 58 in the proximal cross beam 52. These main floor bars are then fixed in position in relation to the cross beams 50 and 52 preferably by means such as friction given by a screw extending through both the top half beam 54 and the bottom half beam 56. By this mechanism, the distance between the proximal cross beam 52 and the distal cross beam 50 may be adjusted to have the same spacing as that between the cross supports 6, 8 which are directly affixed to the automobile and which, typically, cannot be altered by a user of the roof rack.

Turning now to the distal portion 16 of the roof rack, the distal portion is bounded on left and right lateral sides by lateral bars which provide containment along the left and right sides of the rack. On the right side are lateral bar 24 and lateral bar 26. On the left side are lateral bar 62 and lateral bar 64. It will be appreciated that more than, or less than, two lateral bars may be provided. Lateral bars 62 (left) and 24 (right) are connected by bars 25, 34. Additional cross bar 36 may be provided, and lateral bars 64 (left), 26 (right) may be connected by bar 42.

In the floor of the distal portion 16 of the rack are located a plurality of parallel distal floor bars 28. Together, the lateral bars and the distal floor bars provide lateral containment and floor containment respectively for goods that are loaded in the distal portion 16 of the roof rack 10.

The distal terminal ends 49 (FIG. 1) of the distal floor bars 28 are all fixed, preferably by welding, to a distal end cross beam 44. The distal end cross beam 44 is fixed to side bars 26 and 64. Consequently, the distal end cross beam 44 and thus the distal floor bars 28 are all fixed to be immovable in relation to the distal portion 16. Therefore, any movement of the distal portion 16 will be matched by simultaneous movement of the distal floor bars 28.

Turning now to the proximal portion 14 of the roof rack, the proximal portion is bounded on left and right lateral sides by lateral bars which provide containment along the left and right sides of the rack. On the right side are lateral bar 30 and lateral bar 32. On the left side are lateral bar 66 and lateral bar 68. It will be appreciated that more than, or less than, two lateral bars may be provided.

On the floor of the proximal portion 14 of the rack are located a plurality of parallel proximal floor bars 33. Together, the lateral bars and the proximal floor bars provide lateral containment and floor containment respectively for goods that are loaded in the proximal portion 14 of the roof rack 10. The proximal ends of the proximal floor bars 33 are fixed to a proximal cross bar 40 with the result that all proximal floor bars 33 must move in unison with the proximal portion 14. An additional cross bar 38 may be provided to extended adjacent and parallel to cross bar 40.

Assembly

In assembly and operation of the roof rack, the distal portion 16 and the proximal portion 14 are connected to the main portion 12 as follows.

Figure 3:
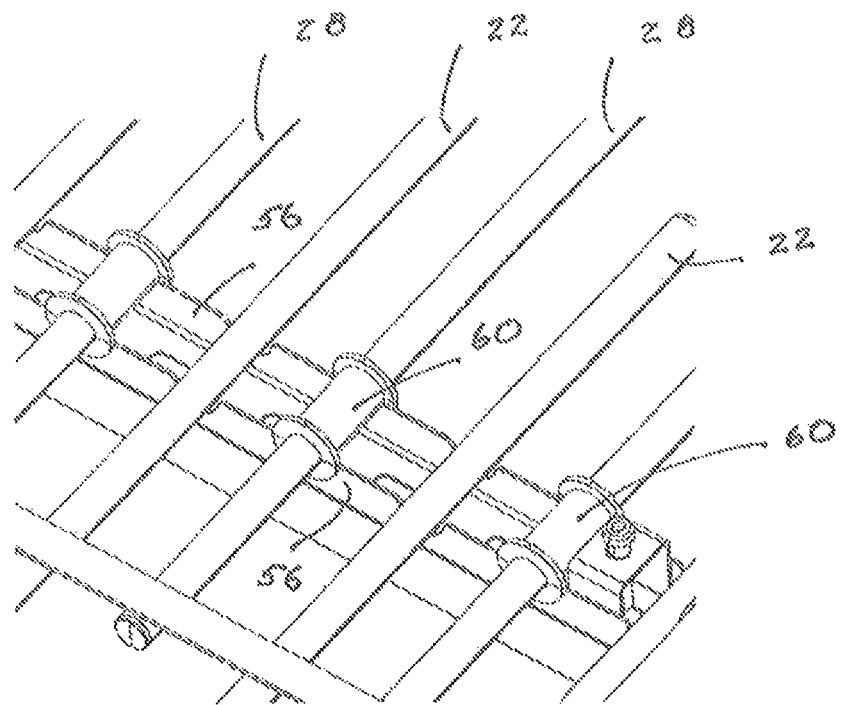
FIG. 3 is a detail view of a portion of the roof rack shown in FIG. 1, partially disassembled to reveal features that are otherwise enclosed.

In respect of the distal portion 16, the distal floor bars 28 of the distal portion may either be (a) inserted, proximal end 51 first, into each of the openings 58 of the distal cross beam 50 which openings may be protected by grommets 60, or (b)

laid vertically downwards, while held horizontally, upon the lower half beam 56 of the cross beam 50 when the upper half beam 54 has been temporarily moved out of the way. The grommets may be configured to allow the distal floor bars 28 to slide within the grommets. Preferably, in one embodiment, the openings 58 that are lined with grommets may, optionally, be spaced alternatingly with openings that are not lined with grommets. In either case, the distal floor bars 28 are preferably spaced alternatingly with the main floor bars 22. As one of ordinary skill will appreciate, the distal floor bars 28 may either (a) be inserted through the openings 58, or (b) the top half beam 54 may be lifted away from bottom half beam 56, the floor bars installed onto the bottom half beam 56, whereafter the top half beam 54 may re-installed on top of the bottom half beam and attached thereto, leaving the distal floor bars protruding from the openings therein. (As seen in FIG. 3, top half beam 54 has been removed, leaving only lower half beam 56 ready to receive a distal floor bar or a main floor bar.)

Once the distal floor bars 28 are inserted into the openings 58 of the distal cross beam 50, a single buffer bar 45 may be affixed (welding or otherwise) to each proximal terminal end 51 of each distal floor bar 28. The buffer bar 45 acts as a "stop" or "buffer" to prevent the distal floor bars 28 being accidentally withdrawn distally from the openings 58.

An additional feature, which allows the distal portion 16 to be moved distally and, alternatingly, proximally in relation to the main portion 12, is that the distal side bars 62, 64 are inserted into, and sized to telescope within, the main side bars 21, 19 respectively. Likewise, distal side bars 24, 26 are inserted into, and sized to telescope within, the main side bars 20, 18 respectively. To prevent these telescoping side bars from free movement in relation to each other, a locking device 70 of standard configuration is positioned at the interface, to be locked once the required separation between the main portion 12 and distal portion 16 is selected.

Thus there is described above a distal portion 16 of the rack 10 that is configured to be attached distally to the main portion 12 so as to be adjustable both proximally and distally in amount of separation in relation to the main portion 12, and to be locked into position by locks 70 on the side bars 24, 62 once a desired degree of separation is achieved.

Having described the interface between the main portion 12 and the distal portion 16 of the roof rack 10, one of ordinary skill in the art will appreciate that the same type of interface, in mirror image, may be used to connect the proximal portion 14 with the main portion 12. Cross beam 52 with openings 58 will substitute for cross beam 50 with openings 58. The proximal floor bars 33 will substitute for the distal floor bars 28. The proximal buffer bar 47 will substitute for the distal buffer bar 45—and so on. In short, the mirror symmetry of the arrangement will allow the proximal portion 14 to be movable both proximally and distally in relation to the main portion 12, to be locked into position by locks 70 once a desired amount of separation is achieved.

Other Features.

Figure 2:
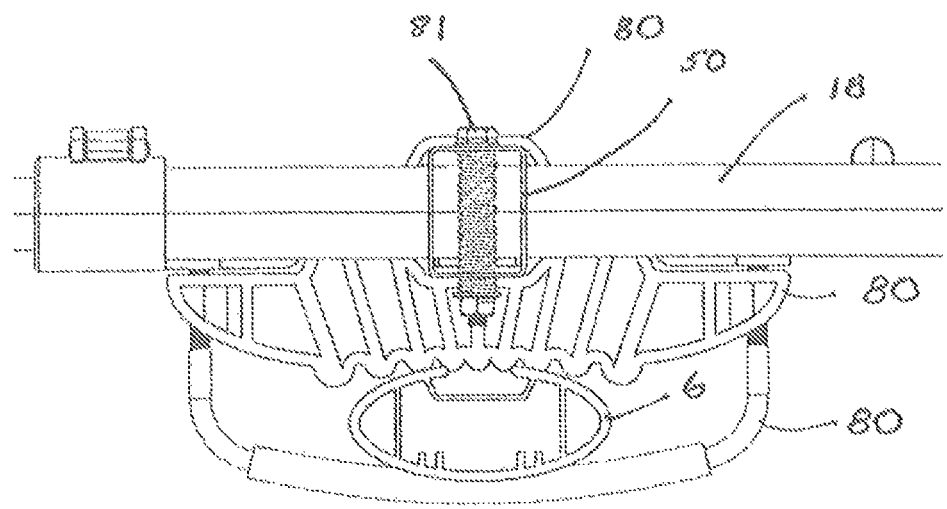
FIG. 2 is a detail view of a portion of the roof rack shown in FIG. 1.

Other features of the roof rack 10 include an attachment system 80 of known type for attaching the roof rack 10 to the cross supports 6, 8 (FIG. 2). It will also be noted that because the cross beams 50, 52, are each made of two separate components (top half beam 54 and bottom half beam 56) the top and bottom half beams may be temporarily separated, and adjusted in their position along the proximal/distal axis before being connected again via screw means 81, 83 extending through beams 50, 52 with sufficient clamping force (onto bars 18, 19) to prevent further movement of the cross beam along the proximal/distal axis. This allows the user to adjust the distance separating the cross beams 50, 52 from each other to match the distance separating the support beams 6, 8 from each other and attached to the automobile, thus providing a secure support of the roof rack to the automobile.

Thus, there has been described a roof rack which has the advantage of being adjustable in overall length from proximal end to distal end. If it is desired to make the length shorter, the user opens the locking systems 70 to allow the distal portion 16 to be pushed proximally towards the main portion, before the locking systems 70 are re-locked. The same applies to the proximal portion, which may be pushed distally, and locked in position.

An advantage also arises from the fact that the main floor beams are spaced alternatingly with the distal floor beams (and the main floor beams are spaced alternatingly with the proximal floor beams) is that ability to support load is evenly and closely distributed laterally across the floor of the roof rack 10.

Although preferred illustrative variations of the present invention are described above, it will be apparent to those skilled in the art that various changes and modifications may be made thereto without departing from the invention. It is intended in the appended claims to cover all such changes and modifications that fall within the scope of the invention as set forth in the claims.

I claim:

1. An adjustable roof rack having a proximal end and a distal end and a left side and a right side, the adjustable roof rack comprising:
  a main portion, configured to be anchored to a roof of an automobile, the main portion comprising:
    a distal cross beam attached to the main portion, the distal cross beam extending from the left side toward the right side and which defines a plurality of openings extending through the distal cross beam, each opening configured to receive a bar extending in a direction from the proximal end toward the distal end;
    a plurality of main floor bars, each main floor bar extending through one of the openings respectively in the distal cross beam, and being attached to the distal cross beam so as to be positionally adjustable in relation to the distal cross beam;
  a distal portion movably attached to the main portion, wherein the distal portion comprises:
    a plurality of distal floor bars, each distal floor bar having a distal end and a proximal end, and being fixed at the distal end thereof to the distal portion, each distal floor bar being arranged to slidably extend through one of the openings respectively in the distal cross beam,
  whereby, the distal portion is movable proximally and, alternatively, distally in relation to the main portion such that when the distal portion is moved proximally, or distally, all of the distal floor bars move simultaneously within the openings in the distal cross beam.

2. The adjustable roof rack of claim 1, wherein the distal cross beam comprises a top half beam, and a bottom half beam, which are configured such that, when the top half beam is placed in contact with the bottom half beam, the distal cross beams are formed and the openings are formed in the distal cross beam.

3. The adjustable roof rack of claim 2, wherein the distal cross beam is attached at a left extremity to a left side lateral bar of the main portion and at a right extremity to a right side lateral bar of the main portion, and wherein the top half beam and the bottom half beam may be temporarily separated from each other whereupon the distal cross beam may be adjusted in its longitudinal relation to the left side lateral bar and the right side lateral bar.

4. The adjustable roof rack of claim 3, further comprising screw means for clamping the top half beam onto the bottom half beam sufficient to also clamp the distal cross beam onto the left side lateral bar and the right side lateral bar.

5. The adjustable roof rack of claim 1, wherein the openings in the distal cross beam are arranged so that each alternate opening is fitted with a grommet to facilitate distal alternately proximal movement of a distal floor bar.

6. The adjustable rack of claim 1, wherein a buffer bar is provided to extend in a direction from the left side toward the right side, and is attached to each of the distal floor bars adjacent a proximal end of each distal floor bar so that, in a condition when the distal portion is moved distally, the buffer bar comes into contact with the distal cross beam to provide a maximum extent to which the distal portion may be moved distally.

7. The adjustable roof rack of claim 1, further wherein the main portion further comprises:
a proximal cross beam attached to the main portion, the proximal cross beam extending from the left side toward the right side and which defines a plurality of openings extending through the proximal cross beam, each opening configured to receive a bar extending in a direction from the proximal end toward the distal end; and further wherein,
each main floor bar extends through one of the openings respectively in the proximal cross beam, and is attached to the proximal cross beam so as to be positionally adjustable in relation to the proximal cross beam;
and, wherein, the adjustable roof rack further comprises a proximal portion movably attached to the main portion, wherein the proximal portion includes
a plurality of proximal floor bars each having a distal end and a proximal end, each proximal floor bar being immovably fixed at the proximal end thereof to the proximal portion, each proximal floor bar being arranged to slidably extend through one of the openings respectively in the proximal cross beam,
whereby, the proximal portion is movable proximally and, alternatively, distally in relation to the main portion such that when the proximal portion is moved proximally, or distally, all of the proximal floor bars move simultaneously within openings in the proximal cross beam.

* * * * *